United States Patent [19]

Hecht et al.

[11] Patent Number: 5,657,245

[45] Date of Patent: Aug. 12, 1997

[54] COMPONENT MAINTENANCE SYSTEM

[75] Inventors: Michael D. Hecht, Hempfield Twp.; Chris W. Bach, Jeanette; Steve J. Orbon, Greensburg; Paul J. Boone, Bethel Park; John M. Driggers; Stephen M. Ira, both of Pittsburgh; Lyman J. Petrosky, Unity Township, all of Pa.

[73] Assignee: Westinghouse Electric Corporation, Pittsburgh, Pa.

[21] Appl. No.: 281,713

[22] Filed: Nov. 9, 1994

[51] Int. Cl.$^6$ .................... G01N 1/08; G01N 27/82; G21C 7/36

[52] U.S. Cl. .................... 364/505; 364/492; 364/494; 364/511; 364/512; 364/552; 364/571.04; 376/261; 376/252; 73/601; 324/228

[58] Field of Search .................... 364/492, 494, 364/505, 511, 512, 552, 571.01, 571.04, 571.07; 376/216, 252, 261; 324/232, 220, 228; 73/601, 620–623

[56] References Cited

U.S. PATENT DOCUMENTS

| | | | |
|---|---|---|---|
| 4,801,421 | 1/1989 | Ackerson et al. | 376/249 |
| 4,914,657 | 4/1990 | Walter et al. | 371/11.3 |
| 4,961,898 | 10/1990 | Bogard et al. | 376/245 |
| 4,980,857 | 12/1990 | Walter et al. | 364/900 |
| 5,005,142 | 4/1991 | Lipchak et al. | 364/550 |
| 5,009,833 | 4/1991 | Takeuchi et al. | 376/217 |
| 5,105,876 | 4/1992 | Burack et al. | 376/260 X |
| 5,132,920 | 7/1992 | Bellows et al. | 364/551.01 |
| 5,182,513 | 1/1993 | Ypung et al. | 324/232 |
| 5,225,147 | 7/1993 | Lin et al. | 376/216 |
| 5,265,035 | 11/1993 | Reifman et al. | 364/551.01 |
| 5,287,264 | 2/1994 | Arita et al. | 364/184 |
| 5,311,562 | 5/1994 | Palusamy et al. | 376/215 |
| 5,408,883 | 4/1995 | Clark et al. | 73/601 |

*Primary Examiner*—Emanuel T. Voeltz
*Assistant Examiner*—Kamini Shah
*Attorney, Agent, or Firm*—David G. Maire

[57] ABSTRACT

A component maintenance system having a network linked to a data acquisition system, a data analysis system, a historical file of component design and inspection information, and a diagnostic system having the capability to perform structural analysis of discontinuities identified by the data acquisition system. The network nodes may be located apart from each other; for example in the maintenance of a nuclear power plant steam generator, the data acquisition system may be located in a high radiation area while the data analysis system is safely located away from the radiation areas. Furthermore, the diagnostic system and the file of component design and inspection history information may be centrally located and shared to support component evaluations being conducted in numerous geographic locations. Network communication facilitates the rapid evaluation of discontinuities, thereby permitting the inspection plan to be modified as the inspection results are obtained.

13 Claims, 1 Drawing Sheet

COMPONENT MAINTENANCE SYSTEM

BACKGROUND OF THE INVENTION

The proper maintenance of industrial components involves many activities and a variety of scientific disciplines. For example, the maintenance of steam generators of a nuclear power plant involves the fields of nondestructive testing, chemical and mechanical cleaning, robotics, mechanical engineering, metallurgy, fracture analysis, welding and radiological protection. Typically a steam generator is inspected and cleaned during a plant outage. If the inspection reveals degradation or damage to the component, repair activities are undertaken. Between outages, the history of inspection results and repair activities involving the steam generator may be evaluated in an effort to specify inspections for the next outage and to predict the repair activities which may be required.

The maintenance of a nuclear steam generator is an expensive and time consuming task. Often the steam generator activities are on the critical path for returning the plant to power operation. Delays can occur during many phases of the outage activities. For example, nondestructive inspection data, such as eddy current test data of steam generator tubes, must be analyzed to determine if there are discontinuities or flaws in the component. If the data includes any sort of anomaly, a diagnosis must be performed to determine if the anomaly is significant enough to prevent the continued operation of the component. When there is a history of inspections for the steam generator or a family of similar components in service at other locations, it is often helpful to compare the data being analyzed to that taken previously, and to identify any similarities or trends which may be present. Once a degradation mechanism is understood and properly characterized, a repair program may be prepared and implemented. The conservative repair option for nuclear steam generator tubes is to remove the tube from service by plugging. However, this option reduces the operating margin of the component, and it is not the most desirable option over the long term. Due to the demands of the plant schedule, it is often this most conservative option which is chosen, since the time necessary to properly analyze other options is not available.

SUMMARY

In order to optimize the maintenance of plant components, it is the object of this invention to provide a maintenance system which provides improved flexibility for the rapid inspection, analysis, and repair of the component and which better integrates the inspection, analysis, and repair activities. To achieve this object, this invention teaches a system for maintaining a component having a means for acquiring data representing discontinuities in the component; a means for analyzing the data; a means for storing information; and a means for diagnosing the condition of the component; wherein the means for acquiring, analyzing, storing and diagnosing are interconnected on a network, such that the output of the acquiring means comprises an input to the analyzing means, and the output of the analyzing means and the output of the storing means comprise inputs to the diagnosing means.

DETAILED DESCRIPTION OF THE INVENTION

Figure 1:
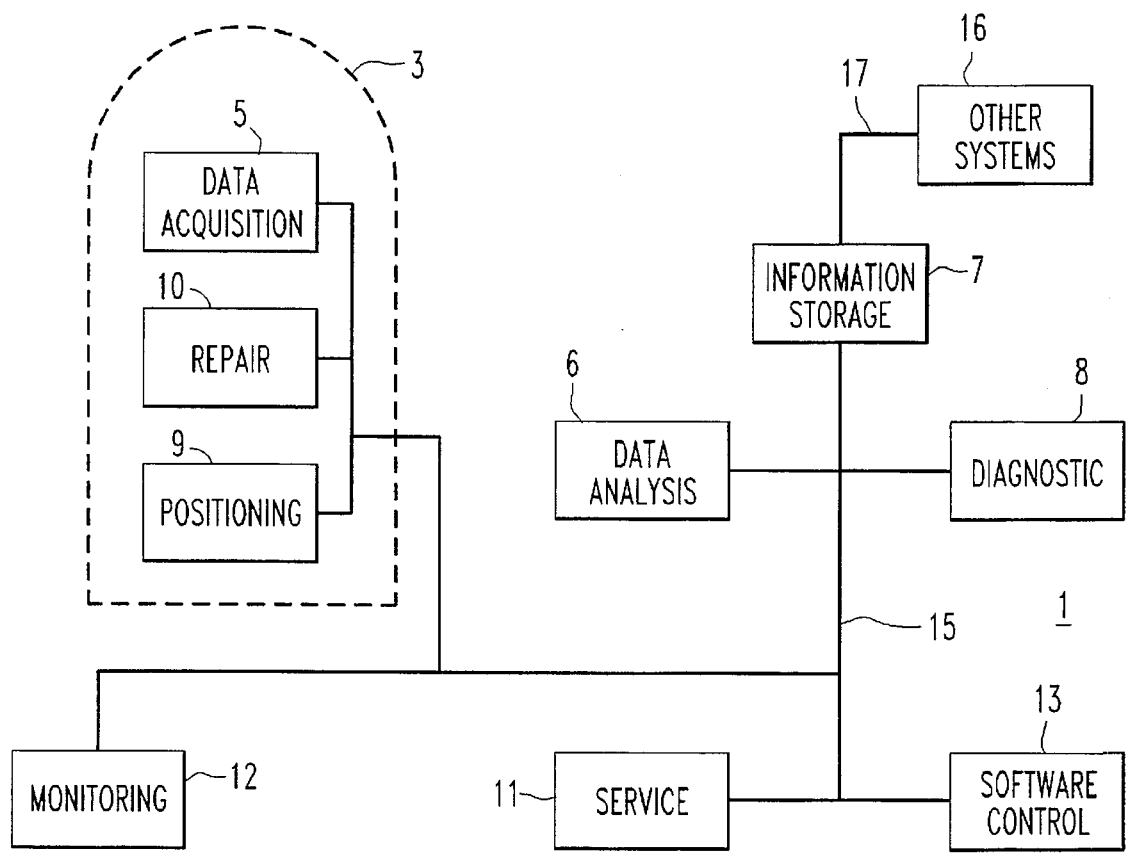
FIG. 1 is a block diagram describing a maintenance system for a nuclear power plant steam generator designed in accordance with this invention.

A preferred embodiment of this invention is illustrated in FIG. 1. This embodiment is a system 1 for the maintenance of a steam generator in a pressurized water reactor nuclear power plant. A reactor containment building 3 is shown in phantom to illustrate the location of the elements of the system 1 in relation to the location of the nuclear plant buildings. The system 1 includes a network having a plurality of nodes 5-13 interconnected by a data link 15. The data link 15 is illustrated as solid lines in FIG. 1. Nodes 5-13 on the network are illustrated as rectangular blocks. The system 1 provides complete capability to obtain data regarding the condition of the steam generator, to analyze the data obtained in real time, to evaluate the data on the basis of comparisons to historical and design data, to diagnose problems regarding the condition of the steam generator, to plan and implement repairs as necessary, and to monitor and manage the overall system performance.

The data link 15 of system 1 can take many forms, for example a coaxial cable, a phone line, an RF connection, a fiber optic link, or a combination of such communication devices. The selection of the specific computer and communications hardware to implement this invention will depend on the functional criteria for the specific application. Processors may be distributed at one or more node of the network, as is well know in the art of computer networks. Similarly, data and software programs may be located in a variety of storage devices, such as floppy or hard disks, optical disks, magnetic tapes, etc., and can be accessed from any location on the network.

The system of FIG. 1 contains a means for acquiring data 5 representing discontinuities in the component. The means for acquiring data 5 may be, for example, a nondestructive inspection system such as an eddy current or ultrasonic testing system, or it may be an on-line information system, such as an acoustic, thermal, or flow rate monitor. The data acquiring means 5 is connected via the data link 15 as a node of the network so that the data can be stored and retrieved by other nodes of the network. One application of such an embodiment would be for the acquiring means 5 to be an eddy current inspection system for acquiring data representing discontinuities in the steam generator tubes. The inspection probe and eddy current instrument of such a system would be located within the containment building 3, while the controlling computer and optical disk for data storage is located on the network outside of the containment 3.

The system 1 also includes a means for analyzing data 6. The selection of the analyzing means 6 will follow from the type of acquiring means 5 utilized, and may be, for example, an eddy current or ultrasonic data analysis system. The analyzing means 6 must be operable to interpret the relationship between the data acquired by the acquiring means 5 and the actual physical condition of the component being inspected. The analyzing means 6 receives as input the data which is output from the acquiring means 5. In the embodiment described above, the analyzing means 6, an eddy current data analysis system, has access to the data from the optical disk immediately following the acquiring of the data, so that analysis of the data can proceed in real time. The data analysis means 6 may include manual analysis and/or automated computer analysis.

A means for storing information 7 is also connected as a node on the network and may contain historical information regarding inspection data, actual discontinuities in the component, and/or data and discontinuities in similar components. The storing means 7 may also contain plant specific operational data regarding the component. For a nuclear steam generator this information may include prior outage inspection results as well as water chemistry, thermal cycling, or sludge accumulation information. The storing means 7 may also include design and as-built information regarding the component. The storing means 7 may be located at the plant site or at a central engineering location which serves numerous plant sites, or it may be a combination of the two.

A means for diagnosing the condition of the component 8 takes as input the outputs of the analyzing means 6 and the storing means 7. The diagnosing means 8 provides the capability for performing an evaluation of any discontinuities in the component which were identified by the data acquiring means 5 and were interpreted by the data analyzing means 6. The means for diagnosing 8 may include a structural analysis system and/or a metallurgical evaluation capability operable to calculate the structural effect of discontinuities identified in the component. Furthermore, because historical information regarding discontinuities is available via the network from the information storing means 7, the diagnosing means 8 may be capable of trending analysis regarding the progression of discontinuities over time. By relating the operational history of the component to the trend of discontinuity progression, the diagnosing means 8 may be operable to provide recommendations regarding future inspections or the scheduling of repairs on the component.

The acquiring means 5 will typically include a sensor, such as an eddy current probe or ultrasonic transducer, which must be positioned within the component to acquire the data. In a hazardous environment application it is desirable to have a means for positioning 9 which is operable to position the acquiring means relative to the component. The means for positioning 9 is typically a robotic arm or other similar mechanical tool. The controls for such a robotic arm are connected as a node of the network of system 1. The positioning means 9 may also be used to deliver a means for repairing 10 to the component, for example plugging or sleeving tooling for repairing steam generator tubes. The control system for such tooling is also connected as a node of the network of system 1.

A means for servicing 11 may be added to the network to collect data regarding the performance of the network, including the performance of any inspection device, robotic arm, or repair tooling operated via the network. The servicing means 11 can monitor system performance and provide an early warning of degraded performance, and it can collect data for the accumulation of a data base upon which design modification and maintenance decisions may be based. By manipulating such information, the servicing means 11 may be operable to generate maintenance recommendations for the system 1 or any portion thereof during or after each plant application. When a maintenance or repair activity is accomplished on any part of the system 1, information regarding the such activity is transferred to and stored by the information storing means 7. The servicing means 11 may be located at a central location where inspection and repair tooling is stored and maintained.

The system 1 illustrated in FIG. 1 facilitates the delivery of comprehensive inspection, maintenance and repair services in a manner which achieves the object of this invention. Prior to a plant outage, operating data and historical inspection and repair information regarding the component are transferred from the information storing means 7 to the diagnosing means 8. With this information, an inspection and maintenance plan is prepared, either manually or by a computer program designed for such a purpose. For example, if a particular steam generator in a plant, or a family of steam generators in similar plants, have a history of developing a certain type of discontinuity under certain operating conditions, an inspection plan can be prepared which is likely to find any such indication. The system components which comprise the diagnosing means 8 and the information storing means 7 may be located away from the physical location of the component. Once the component is taken out of service, the system components which comprise the data acquiring means 5 and the positioning means 9 may be moved to the plant site and connected to the system 1 via a datalink 15. In the case of a nuclear steam generator inspection, the robotic arm of the positioning means 9 is moved into the reactor containment, and the eddy current or ultrasonic inspection equipment of the acquiring means 5 is set up at the plant site and connected to the network after the plant has been shut down. The on-site equipment is connected by data link to the off-site equipment prior to beginning the inspection operation.

The control station for the data acquiring means 5 and the positioning means 9 are typically located together physically, since control of the positioning arm and control of the data acquisition equipment must be closely coordinated. This control may be manual control by an operator or it may be an automated control with little or no operator intervention necessary. When the data is acquired, it is transferred via the datalink 15 to the analyzing means 6, preferably via the storing means 7. Analysis of the data may be performed by a human or it may be computerized, or any combination thereof. The data analysis means 6 can identify any quality problem with the data, whereupon it may provide feedback to the data acquiring means 5 to repeat the inspection in order to obtain higher quality data. Furthermore, if the output of the diagnosing means 8 indicates the need for additional testing, this requirement is conveyed via the datalink 15 to the data acquisition means 5, which in turn may automatically revise the inspection plan accordingly.

A means for monitoring 12 may be added to the system 1 to permit interested parties to have access to current inspection/repair status information. Such a node may typically be a personal computer terminal with limited inquiry capability. The monitoring means 12 may also have the capability for preparing periodic reports, such as a daily status report, or a shift turnover report. A monitoring means 12 can be located at any location, such as the office of the plant manager or an offsite operations manager's office.

A software controlling means 13 may be attached to the system 1 for the purpose of providing software updates and revisions to all of the computers on the system 1. With current methods of inspecting components, it is not uncommon for the various computers which are used to inspect, analyze and to repair the component to be operating on various revisions of software, which in some cases may not be compatible with each other. The controlling means 13 allows a system operator to know exactly what software is being used, and to provide on-line updates to software in the event of problems or revised maintenance plans.

Once any discontinuities in the component are characterized by the data analyzing means 6, this information is transferred via the data link 15 to the information storing means 7. The condition of the component can then be assessed at the diagnosing means 8 by evaluating the impact of the discontinuities on the continued operation of the component. The integrity of the primary water pressure boundary is an important criteria for the safe operation of a nuclear steam generator, and the diagnosing means 8 for this application may therefore include a structural analysis capability for evaluating the impact of discontinuities found in the tubing pressure boundary. The diagnosing means 8 may advantageously be located away from the nuclear power plant site, for example at a central steam generator diagnostic center which services numerous plant sites. Such a center may be staffed by experts in the field who have access to the plant specific information and to the industry-wide data stored in the information storing means 7. When an unexpected inspection result is obtained, these experts have access to the inspection data on a real time basis. In this manner, the system 1 provides a significant cost and schedule improvement over the current methods of conveying information via facsimile transmission or conveying experts to the plant site. This is especially true when the system 1 is used for the inspection of more than one component in more than one physical location, in which case other systems 16 are attached to system 1 via the data link 17.

After the plant outage is completed and the component is placed back in service, the diagnosing means 8 may be used to prepare recommendations regarding the operation, inspection or repair of the component in the future; the servicing means 11 may provide maintenance recommendations for the inspection, positioning and repair equipment, and the storing means 7 provides the results of the inspection to other systems 16 being used to inspect other components. The diagnosing means 8 can also be programmed with the capability for preparing a return to power report, which is a report containing a summary of the inspection results along with the evaluation of the corrective actions taken and the safety of returning the steam generator to service.

The embodiment illustrated in FIG. 1 is given as an example of this invention, and it should in no manner be construed to limit the scope of the invention as claimed below.

We claim:

1. A system for maintaining a component comprising;
    an eddy current inspection system operable to acquire inspection data associated with said component, said inspection data representing a discontinuity in said component;
    a means for analyzing said inspection data;
    a means for storing information; and
    a means for diagnosing the structural effect of said discontinuity on said component;
    wherein said inspection system and said means for analyzing, storing and diagnosing are interconnected by a data link, such that an output of said inspection system is provided as input to said analyzing means, and an output of said analyzing means and an output of said storing means are provided as real time inputs to said diagnosing means, such that the effect of said discontinuity may be diagnosed on a real time basis at a location remote from said component.

2. The system of claim 1, wherein said storing means contains operational data regarding said component, and further comprising said diagnosing means being operable to identify a relationship between a progression of said discontinuity over time said operational data.

3. The system of claim 1, further comprising a means for positioning connected to said data link, said positioning means operable to position eddy current inspection system relative to said component.

4. The system of claim 3, wherein said component comprises a nuclear power plant steam generator, said positioning means comprises a robotic arm, said analyzing means comprises an eddy current data analysis system, said information stored by said storing means comprises design data for said steam generator, and said diagnosing means comprises a structural analysis system.

5. The system of claim 4, further comprising a performance monitor connected to said data link and operable to collect data regarding the performance of said system.

6. The system of claim 5, wherein said performance monitor is operable to generate maintenance recommendations for said system.

7. The system of claim 4, wherein the information stored by said storing means comprises information regarding repairs made to said component.

8. The system of claim 1, wherein said system comprises at least one computer connected to said data link, and further comprising a means for controlling software loaded on said computer operable to provide on-line updates to said software.

9. The network of claim 1, further comprising a means for monitoring connected to said data link.

10. A system for maintaining a nuclear plant steam generator comprising;
    a means for storing data operable to store inspection data and operational data associated with said nuclear plant steam generator;
    an eddy current data acquisition system operable to acquire inspection data associated with a discontinuity in a tube of said steam generator;
    a means for analyzing said inspection data to quantify the location and size of said discontinuity;
    a means for diagnosing the effect of said discontinuity on the structural integrity of said tube, said means for diagnosing being operable to identify a relationship between a change in said discontinuity over time and said operational data; and
    a data link operable to interconnect said means for storing data, said eddy current data acquisition system, said means for analyzing, and said means for diagnosing, such that data associated with a discontinuity is acquired by said eddy current data acquisition system located at said nuclear plant, and said data is analyzed and the effect of said discontinuity is diagnosed on a real time basis at a location remote from said nuclear plant.

11. The system of claim 10, further comprising a performance monitor connected to said data link and operable to collect data regarding the performance of said system.

12. The system of claim 10, wherein said system comprises at least one computer connected to said data link, and further comprising a means for controlling software loaded on said computer operable to provide on-line updates to said software.

13. The system of claim 10, wherein the information stored on said means for storing data further comprises design data for said steam generator.

* * * * *